(12) United States Patent
Morris et al.

(10) Patent No.: US 9,116,561 B2
(45) Date of Patent: Aug. 25, 2015

(54) TIME REFERENCE SYSTEMS FOR CPU-BASED AND OPTIONALLY FPGA-BASED SUBSYSTEMS

(71) Applicant: Spirent Communications, Inc., Sunnyvale, CA (US)

(72) Inventors: John R. Morris, Simi Valley, CA (US); Thomas R. McBeath, Calabasas, CA (US)

(73) Assignee: SPIRENT COMMUNICATIONS, INC., Sunnyvale, CA (US)

( * ) Notice: Subject to any disclaimer, the term of this patent is extended or adjusted under 35 U.S.C. 154(b) by 275 days.

(21) Appl. No.: 13/965,039

(22) Filed: Aug. 12, 2013

(65) Prior Publication Data

US 2014/0331075 A1 Nov. 6, 2014

Related U.S. Application Data

(60) Provisional application No. 61/819,852, filed on May 6, 2013.

(51) Int. Cl.
*G06F 1/12* (2006.01)
*G06F 1/04* (2006.01)

(52) U.S. Cl.
CPC .................................. *G06F 1/04* (2013.01)

(58) Field of Classification Search
CPC ............................................................ G06F 1/04
USPC ........................................................... 713/400
See application file for complete search history.

(56) References Cited

U.S. PATENT DOCUMENTS 6,901,527 B2 * 5/2005 Gregg ........................... 713/500
2007/0104228 A1 * 5/2007 Cohen et al. .................. 370/518

* cited by examiner

*Primary Examiner* — Mark Connolly
(74) *Attorney, Agent, or Firm* — Haynes Beffel & Wolfeld LLP

(57) ABSTRACT

A time reference system includes a master clock, generating a clock reference, interface logic and a CPU-based subsystem. The interface logic receives the clock reference and generates the clock, pulses, and timestamp signals. The CPU-based subsystem includes an internal counter, a CPU and a clock synthesizer, the CPU and receiving the pulses and timestamp signals. The clock synthesizer receives the clock signal and generates a CPU clock signal. Some examples include an FPGA-based subsystem having an FPGA-based card coupled to the interface logic for receipt of the clock, pulses and timestamp signals. In a method the timestamp value T0 is generated by the CPU upon receipt of the timestamp signal. Upon receipt by the CPU of the next pulse signal, a timestamp counter baseline value TSC0 is generated so the CPU internal counter is calibrated to the clock signal.

12 Claims, 3 Drawing Sheets

TIME REFERENCE SYSTEMS FOR CPU-BASED AND OPTIONALLY FPGA-BASED SUBSYSTEMS

CROSS-REFERENCE TO OTHER APPLICATIONS

This application claims the benefit of U.S. provisional patent application No. 61/819,852, filed 6 May 2013, entitled Method and System That Precisely Synchronize Timestamps Generated by an FPGA and a CPU in a Test Drive.

BACKGROUND OF THE INVENTION

A parameter of considerable interest to those testing networks and network equipment, as well as for other reasons, is packet latency. That is, how long it takes between a packet entering the network or network equipment at one point (the source) and when it is delivered at some other point (the destination).

Traditionally, packet latency has been measured by ensuring that the test equipment at the source and destination are equipped with synchronized clocks. Just as the test packet is submitted to the network at the source, the current time is encoded within that packet itself. When the packet is received at the destination, the time of arrival is noted, and by subtracting that from the time contained within the packet the latency can be calculated.

For this to work, the clocks of the source and destination test equipment must be synchronized. Synchronization has been achieved when the packets are originated and terminated in field-programmable gate arrays (FPGAs) with synchronized clocks. The synchronization consists of a central time source with a regular pulse signal to mark the start of each period (typically 10 times per second), a serial line to give the absolute time of the next pulse, and a higher frequency clock (typically 10 MHz) to maintain timing between pulses.

FIG. 1 is a high level schematic illustration of a conventional test system 10. The system 10 includes a clock distribution network at 12 coupled to a master clock 14 which generates a master clock reference 16. As shown, distribution network 12 supplies the same master clock reference 16 to interface logic 18 associated with individual FPGA-based test cards 20. Each test card 20 can include one or more test interfaces 22.

FIG. 2 is a more detailed view of the connection between interface logic 18 and its associated FPGA-based test card 20. Using master clock reference 16, interface logic 18 provides test card 20 with the following signals: clock 24, pulses 26 and timestamp 28. Clock 24 is typically a 10 MHz reference clock while pulses 26 is typically a 10 pulses per second tick. Timestamp 28 is typically provided along a serial line carrying the actual time of day corresponding to the next pulse. Timestamp 28 can be in, for example, ASCII text. For example, timestamp 28 may carry "2013-05-31-15-45-23.7" indicating that the next pulse will occur on 31 May 2013 at time 15:45 and 23.7 seconds. Between pulses, FPGA test card 20 can count clock cycles to get a time accurate to the clock period and can use this to determine the transmission and reception time of frames.

FPGAs are integrated circuits which are designed to be programmed by the user to provide a particular function. The function is therefore effectively provided in hardware. FPGAs provide a fast, powerful tool for the circuit designer. In contrast, the same function provided using a CPU (central processing unit) is effectively provided via software. While FPGAs are powerful, fast and very useful, they are much more expensive than CPU devices.

BRIEF SUMMARY OF THE INVENTION

A time reference system includes a master clock, interface logic and a CPU-based subsystem. The master clock is capable of generating a clock reference. The interface logic is coupled to the master clock for receipt of the clock reference and is capable of generating the following signals: clock, pulses, and timestamp. The clock signal is based on the clock reference, the pulse signal is a signal having a frequency substantially different than the clock signal, and the timestamp signal is a signal comprising the actual time of day corresponding to a chosen following pulse. The CPU-based subsystem includes a CPU and a clock synthesizer. The CPU is coupled to the interface logic for receipt of the pulses and timestamp signals. The CPU has an internal counter. The clock synthesizer is coupled to the interface logic for receipt of the clock signal. The clock synthesizer is capable of generating a CPU clock signal, the CPU clock signal being a function of the clock signal. The CPU is coupled to the clock synthesizer for receipt of the CPU clock signal for use by the internal counter. In some examples the system can include an FPGA-based subsystem having an FPGA-based card coupled to the interface logic for receipt of the clock, pulses and timestamp signals.

A method is used in a system, the system including a master clock providing a clock reference to a CPU-based subsystem. Clock, pulses and timestamp signals are generated from the clock reference. The clock signal is a reference clock signal based on the clock reference, the pulses signal is a signal having a frequency substantially lower than the clock signal, and timestamp as a signal comprising the actual time of day corresponding to a chosen following pulse. The clock signal is delivered to a clock synthesizer of the CPU-based subsystem. The pulses and timestamp signals are delivered to a CPU of the CPU-based subsystem, the CPU including a CPU internal counter. The CPU clock signal is generated by the clock synthesizer based upon the clock signal and delivering the CPU clock signal to the CPU for use by the CPU internal counter. The CPU clock signal is a chosen multiple MF of the clock signal. The CPU internal counter is locked to the clock reference of the master clock through the CPU clock signal. Timestamp value TO is generated by the CPU upon receipt of the timestamp signal. Upon receipt by the CPU of the next pulse signal, a timestamp counter baseline value TSCO is generated. Whereby the CPU internal counter is calibrated to the clock signal. Some examples include one or more of the following. The CPU internal counter is read and a common time value (CTV) is calculated according to the following: $CTV = ((TSC - TSCO)/MF) + TO$, where TO is the timestamp value and TSC is the current count of the CPU internal counter. The system can include an FPGA-based subsystem, and the clock, pulses and timestamp signals can be delivered to the FPGA-based subsystem.

Other features, aspects and advantages of the present invention can be seen on review the drawings, the detailed description, and the claims which follow.

DETAILED DESCRIPTION OF THE INVENTION

Figure 1:
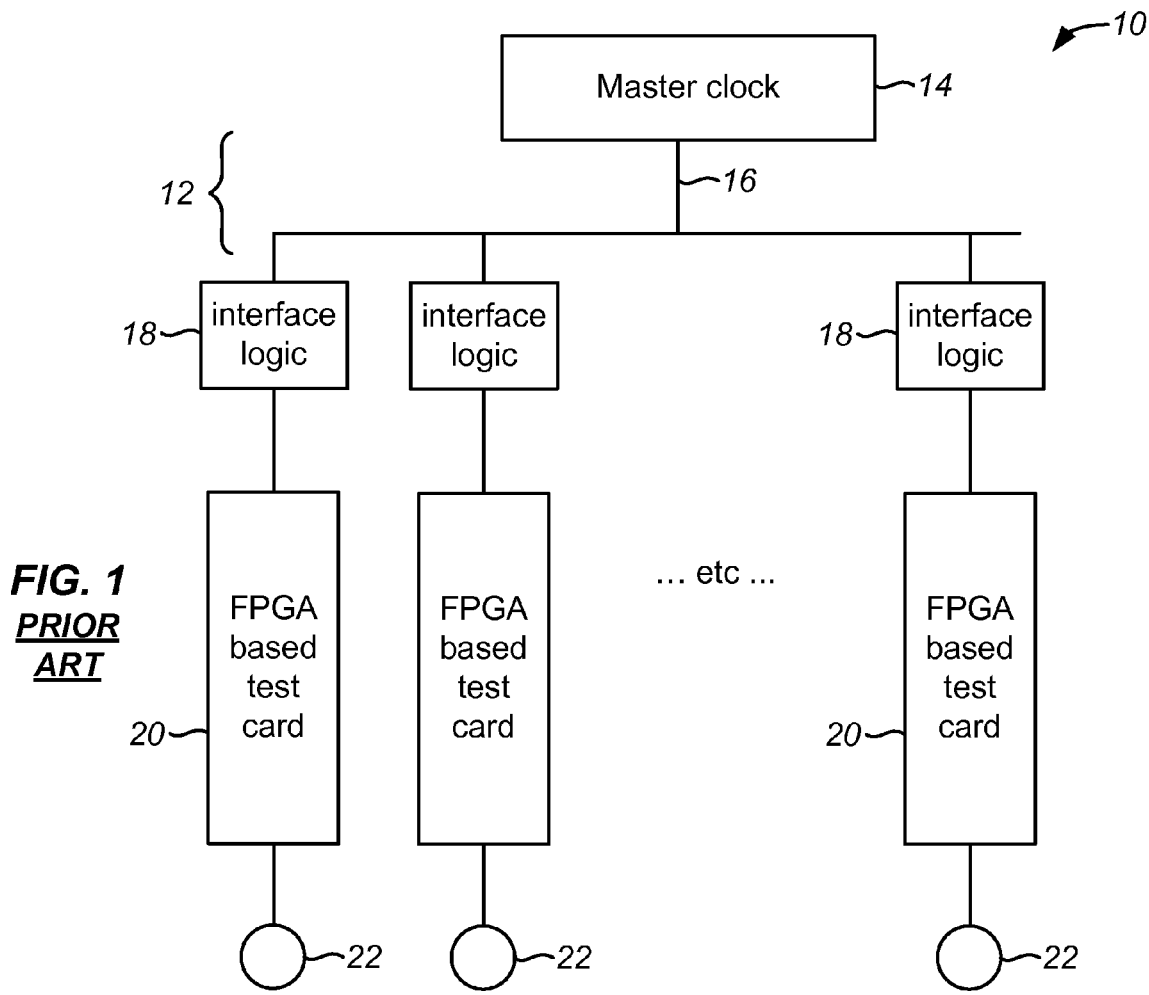
FIG. 1 is a high level schematic illustration of a conventional test system.

The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

Increasingly, CPUs are being used instead of or in addition to FPGAs for generating and analyzing network test packets. Since in a given test setup there may include a mixture of FPGA-based and CPU-based test sets, it is necessary for the CPUs to also have available a time reference synchronized both to the time references of other CPUs and to the time references of the FPGAs.

Modern CPUs typically include one or more internal counters, such as a Time Stamp Counter (TSC) and a High Precision Event Timer (HPET), that are locked to the CPU clock. These counters can be read very quickly by the CPU, without consuming significant CPU resources. When this counter is locked to a reference clock signal, it can be used as the time reference for generating synchronized time stamps.

Figure 2:
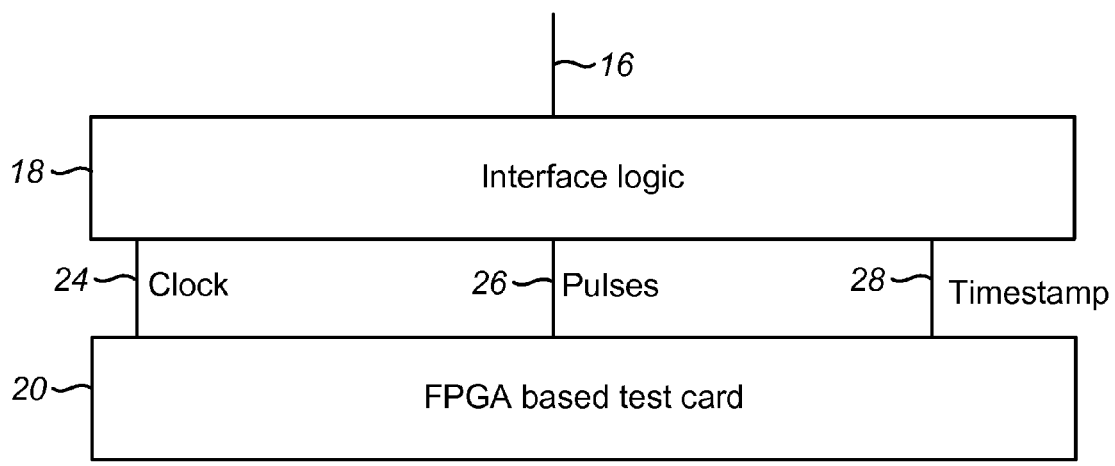
FIG. 2 is a more detailed view of a portion of the conventional test system of FIG. 1 showing the connection between the interface logic and its associated FPGA-based test cards.
Figure 3:
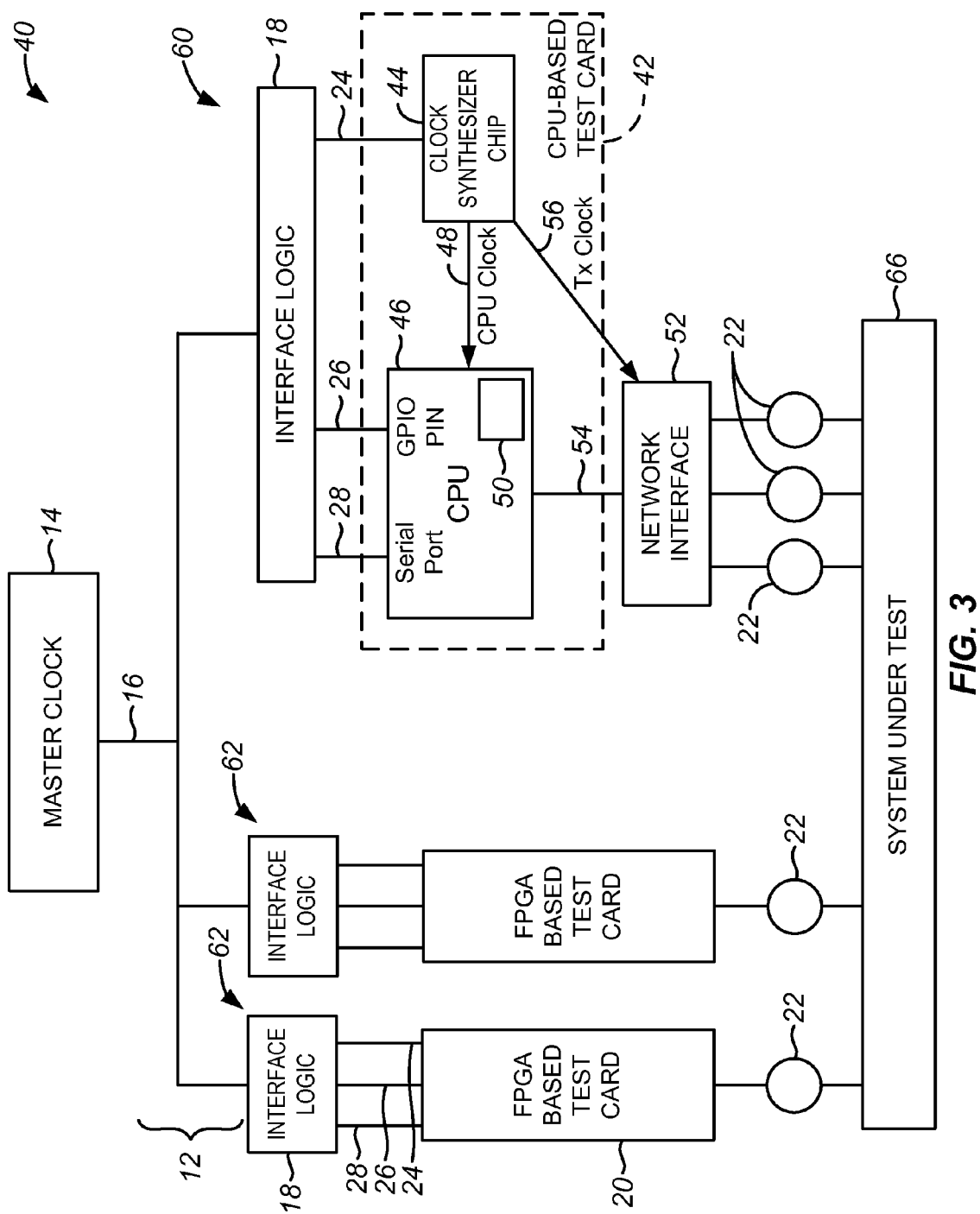
FIG. 3 illustrates a test system made according to the invention similar to the test system of FIGS. 1 and 2, but including one or more CPU-based test cards in addition to zero, one, or more than one FPGA-based test cards.

FIG. 3 illustrates a time reference system, such as a time reference test system 40, similar to test system 10 of FIGS. 1 and 2, but in which a CPU-based test card 42 is used in addition to one or more FPGA-based test cards 20. A problem with the use of CPU-based test cards is that the signals from interface logic 18, that is clock 24, pulses 26 and timestamp 28, which are quite suited for use with FPGA-based test cards 20, by themselves are very badly suited for CPU time referencing. To keep an accurate time the CPU would have to continuously monitor the clock signal 24, counting cycles. This would stop the CPU (or at least one core of the CPU if the CPU has multiple cores) from doing any other useful work.

This problem is addressed by the use of CPU-based test card 42 including a clock synthesizer chip 44 that provides the CPU 46 with the necessary clock frequency (typically a few hundred MHz or a few GHz), referred to as CPU clock 48, that is locked to within a period of the (typically) 10 MHz clock 24 from interface logic 18. In this example master clock reference 16 is a composite of clock 24, pulses 26 and timestamp 28. This then causes the CPU's internal counter 50, such as a TSC, to increment at an exactly known rate with respect to all other FPGA-based test cards 20 and CPU-based test cards 42 in the entire test system 40.

Figure 4:
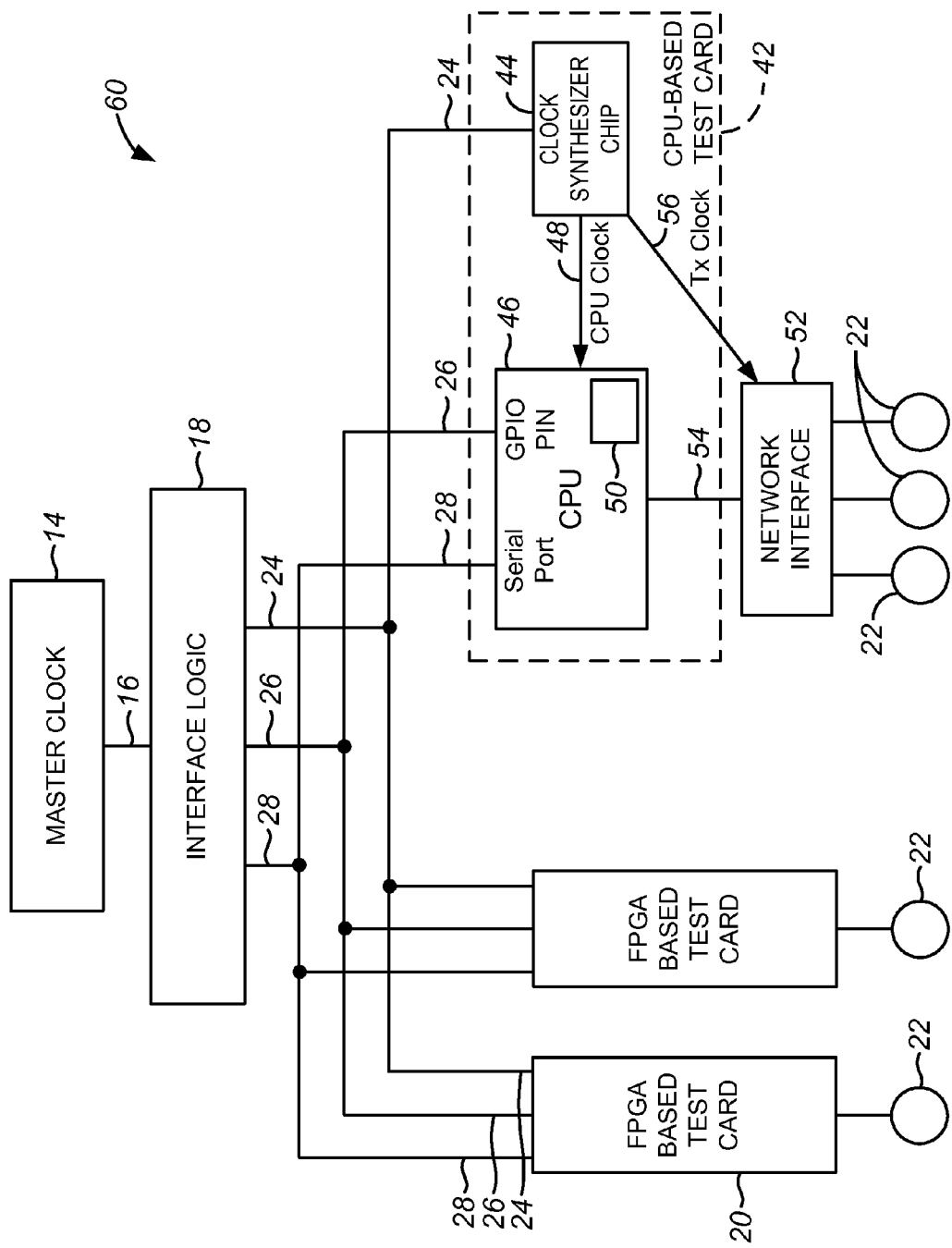
FIG. 4 illustrates a test system similar to that of FIG. 3 but showing use of the same interface logic for each of the test cards.

In the example of FIG. 3, a separate interface logic 18 is shown used with each FPGA-based test card 20 and CPU-based test card 42. However, it is contemplated that the same clock 24, pulses 26 and timestamp 28 signals be supplied to FPGA-based test cards 20 and CPU-based test cards 42. Accordingly, in other examples, see FIG. 4, the same interface logic 18 can be used for multiple FPGA-based test cards 20 and CPU-based test cards 42.

An example of a clock synthesizer chip 44 is made by Analog Devices, Inc. of Norwood, Mass. as the AD9558 and will be used as an example here, but other devices with equivalent functionality are readily available. These clock distribution chips can take as input one frequency and generate from it a different frequency that is a rational fraction or ratio multiple of the input. For example, the AD9558 can take a 10 MHz clock reference originally intended for an FPGA and generate a 1.5 GHz CPU clock 48; the 1.5 GHz signal will be locked to 150 times the 10 MHz input signal. The following is incorporated by reference: Analog Devices AD 9558 data sheet, pages 1-30 of 104.

A second feature of the AD9558 and similar devices is that they support multiple master clocks 14 and will detect which of them are active. If only one clock is active, that one will be used for the reference to generate the output clocks. If multiple master clocks 14 are active one will be selected according to a programmed priority.

A network interface 52 is coupled to CPU 46 by a data line 54 and carries network traffic to a system under test 66 through test interfaces 22. In this example a single network interface 52 is used while in other examples more than one network interface 52 can be used. Data typically travels to the system under test 66 through one test interface 22 with data from the system under test returning through a different test interface 22, which may be an FPGA-based or a CPU-based test interface 22. Additionally, the clock synthesizer chip 44 can provide the appropriate reference frequencies for other parts of the system, such as providing Tx clock signal 56 to the network interface 52 as shown in FIG. 3.

All that is left is to determine the actual time corresponding to the internal CPU counter value from the CPU counter 50 when the system starts. In theory this only needs to be done once, using timestamp 28 and subsequent pulses 26, and recording that time as corresponding to the current internal CPU counter value. In practice it would be done a few times because of the possibility of spurious delays which can occur during system startup.

In summary, by using the CPU's internal counter 50 built into the CPU 46, and an external clock synthesizer chip 44, CPU 46 has the ability to use a set of time reference signals, that is clock 24, pulses 26 and timestamp 28, that were intended for FPGA use, without consuming great amounts of CPU resources.

While test system 40 finds particular utility when using a combination of FPGA-based test cards 20 and CPU-based test cards 42, in some examples all of the test cards can be CPU-based test cards 42. In the example of FIG. 3, the serial port and the general purpose input/output pin (GPIO pin) are shown as being part of the CPU; in other examples one or both may be external components attached to, for example, a CPU bus, not shown. CPU-based test card 42 is shown as including CPU 46 and clock synthesizer chip 44; these two components may or may not be part of the same physical card. In some examples the same clock synthesizer chip 44 can be used for several CPUs 46.

An example sequence of operations of a CPU 46 in the startup of system 40 is:
1) The hardware is arranged so that by default the clock synthesizer chip 44 takes as its input reference clock 24.
2) The CPU 46 boots its operating system as usual.
3) The CPU 46 checks for the presence of clock 24 from master clock 14 through interface logic 18. There is a register in the clock synthesizer chip 44 to report this.
4) Assuming the clock 24 is present, the CPU 46 reconfigures the clock synthesizer chip 44 to switch to the master clock reference 16 as the reference. Clock 24 is used in FIG. 3 for one embodiment, however, there can be multiple clock sources (not shown) from the master clock 14 for the CPU to choose from.

5) The CPU internal counter 50 of CPU 46 is now locked to the clock 24, incrementing at a known and fixed multiple of that clock. Call this multiple MF.

6) The CPU 46 now suspends all other activity, and waits for a timestamp 28 to be presented to a serial port. This is recorded as T0.

7) The CPU 46 enters a fast, tight loop monitoring of the pulses 26 at the GPIO pin, in this example at 10 pulses per second. As soon as pulses 26 is asserted, the CPU 46 reads its CPU internal counter 50 to give a timestamp counter baseline, referred to as a base TSC value, TSC0.

8) The CPU 46 allows other activity to proceed as normal.

The CPU internal counter 50 is now calibrated to, in one example, a distributed 10 MHz clock reference signal 24 supplied to clock synthesizer chip 44. Any program on the CPU 46 can therefore obtain the same time value as an FPGA-based card 20 by reading the CPU internal counter 50 and calculating:

$$time=((TSC-TSC0)/MF)+T0$$

where TSC is the current count of CPU internal counter 50, and MF is a known and fixed multiple of the clock 24 as discussed above.

Multiple CPUs 46 in the system 40 can perform the same procedure at startup, with each having a common time reference time (CTR time) as calculated by the equation: CTR time=((TSC−TSC0)/MF)+T0.

As all FPGA-based test cards 20 and CPU-based test cards 42 in the system use the same time reference, every packet generating and analyzing device, whether it be a CPU-based test card 42 or an FPGA-based test card 20, will have precisely synchronized time references that will remain synchronized, without further CPU effort, for as long as the equipment is left to run.

The result is that:

1 All components of the CPU based subsystem 60, including interface logic 18, CPU 46, clock synthesizer chip 42 and network interface 52, operate synchronously with one another.

2 All sub-systems, including CPU based subsystems 60 and FPGA based subsystems 62, in system 40 have a common time reference, such as master clock reference 16, without using CPU resources.

The device and hardware configuration described can implement any of the additional method features described above.

An example of a method for use in a system 40 is carried out as follows. As discussed above, system 40 includes a master clock 14 providing a master clock reference 16 to a CPU-based subsystem 60 and an FPGA-based subsystem 62. Clock signal 24, pulses signal 26 and timestamp signal 28 are generated from the master clock reference 16. The clock signal 24 is a reference clock signal based on the master clock reference 16. The pulses signal 26 is a signal having a frequency substantially lower than the clock signal 24. The timestamp signal 28 is a signal comprising the actual time of day corresponding to a chosen following pulse signal 26.

The clock, pulses and timestamp signals 24, 26 and 28 are delivered to an FPGA-based subsystem 62. The clock signal 24 is delivered to a clock synthesizer 44 of the CPU-based subsystem 60. The pulses and timestamp signals 26 and 28 are delivered to a CPU 46 of the CPU-based subsystem 60. The CPU 46 includes a CPU internal counter 50. A CPU clock signal 48 is generated by the clock synthesizer 44 based upon the clock signal 24. The CPU clock signal 48 is delivered to the CPU 46 for use by the CPU internal counter 50, the CPU clock signal 48 being a chosen multiple MF of the clock signal 24. MF can be, for example, a chosen one of a rational fraction or a ratio multiple. The CPU internal counter 50 is locked to the master clock reference 16 through the CPU clock signal 48. A timestamp value T0 is generated by the CPU upon receipt of the timestamp signal 28.

On receipt by the CPU 46 of the chosen following pulse signal 26, typically the next pulse signal 26, a timestamp counter baseline value TSC0 is generated so that CPU internal counter 50 is calibrated to the clock signal 24. Any program on the CPU 46 can obtain the same time value as an FPGA-based card 20 by reading the CPU internal counter 50 and calculating a common time value (CTV) according to the following:

$$CTV=((TSC-TSC0)/MF)+T0$$

where TSC is the current count of the CPU internal counter.

While the present invention is disclosed by reference to the preferred embodiments and examples detailed above, it is to be understood that these examples are intended in an illustrative rather than in a limiting sense. For example, system 40 is described with reference to a time reference testing situation. However, system 40 can extend to time reference systems not acting as time reference testing systems. It is contemplated that modifications and combinations will occur to those skilled in the art, which modifications and combinations will be within the spirit of the invention and the scope of the following claims.

The invention claimed is:

1. A time reference system comprising:
a master clock capable of generating a clock reference;
interface logic coupled to the master clock for receipt of the clock reference, the interface logic capable of generating the following signals: clock, pulses, and timestamp signals;
the clock signal being based on the clock reference, the pulse signal being a signal having a frequency substantially different than the clock signal, and the timestamp signal being a signal comprising the actual time of day corresponding to a chosen following pulse; and
a CPU-based subsystem comprising:
a CPU coupled to the interface logic for receipt of the pulses and timestamp signals, the CPU comprising an internal counter;
a clock synthesizer coupled to the interface logic for receipt of the clock signal, the clock synthesizer capable of generating a CPU clock signal, the CPU clock signal being a function of the clock signal; and
the CPU coupled to the clock synthesizer for receipt of the CPU clock signal for use by the internal counter.

2. The system of claim 1, further comprising an FPGA-based subsystem, the FPGA-based subsystem comprising an FPGA-based card coupled to the interface logic for receipt of the clock, pulses and timestamp signals.

3. The system of claim 2, further comprising:
a first interface coupled to the FPGA-based card; and
a second interface coupled to the network interface.

4. The system of claim 2, further comprising a first said interface logic for the FPGA-based subsystem and a second said interface logic for the CPU-based subsystem.

5. The system of claim 1, wherein the clock synthesizer is capable of generating a Tx clock signal, the TX clock signal being a function of the clock signal.

6. The system of claim 5, further comprising:
a network interface operably coupled to:

the CPU; and the clock synthesizer for receipt of the Tx clock signal.

7. A method for use in a system, the system including a master clock providing a clock reference to a CPU-based subsystem, the method comprising:

generating clock, pulses and timestamp signals from the clock reference, the clock signal being a reference clock signal based on the clock reference, the pulses signal being a signal having a frequency substantially lower than the clock signal, and timestamp being a signal comprising the actual time of day corresponding to a chosen following pulse;

delivering the clock signal to a clock synthesizer of the CPU-based subsystem;

delivering the pulses and timestamp signals to a CPU of the CPU-based subsystem, the CPU comprising a CPU internal counter;

generating a CPU clock signal by the clock synthesizer based upon the clock signal and delivering the CPU clock signal to the CPU for use by the CPU internal counter, the CPU clock signal being a chosen multiple MF of the clock signal;

locking the CPU internal counter to the clock reference of the master clock through the CPU clock signal;

generating a timestamp value TO by the CPU upon receipt of the timestamp signal; and upon receipt by the CPU of the next pulse signal, generating a timestamp counter baseline value TSCO;

whereby the CPU internal counter is calibrated to the clock signal.

8. The method of claim 7, further comprising:

reading the CPU internal counter and calculating a common time value (CTV) according to the following:

$$CTV = ((TSC - TSCO)/MF) + TO$$

where TSC is the current count of the CPU internal counter.

9. The method of claim 7, wherein MF is a chosen one of a rational fraction or a ratio multiple.

10. The method of claim 7, wherein the clock signal is a 10 MHz reference clock signal and the pulses signal is a 10 pulses per second signal.

11. The method of claim 7, wherein the chosen following pulse is the next pulse.

12. The method of claim 7, wherein the system includes an FPGA-based subsystem, and further comprising delivering the clock, pulses and timestamp signals to the FPGA-based subsystem.

* * * * *